Oct. 3, 1939.  J. DUSEVOIR ET AL  2,174,780
VARIABLE STROKE CONNECTING ROD
Filed Jan. 3, 1938
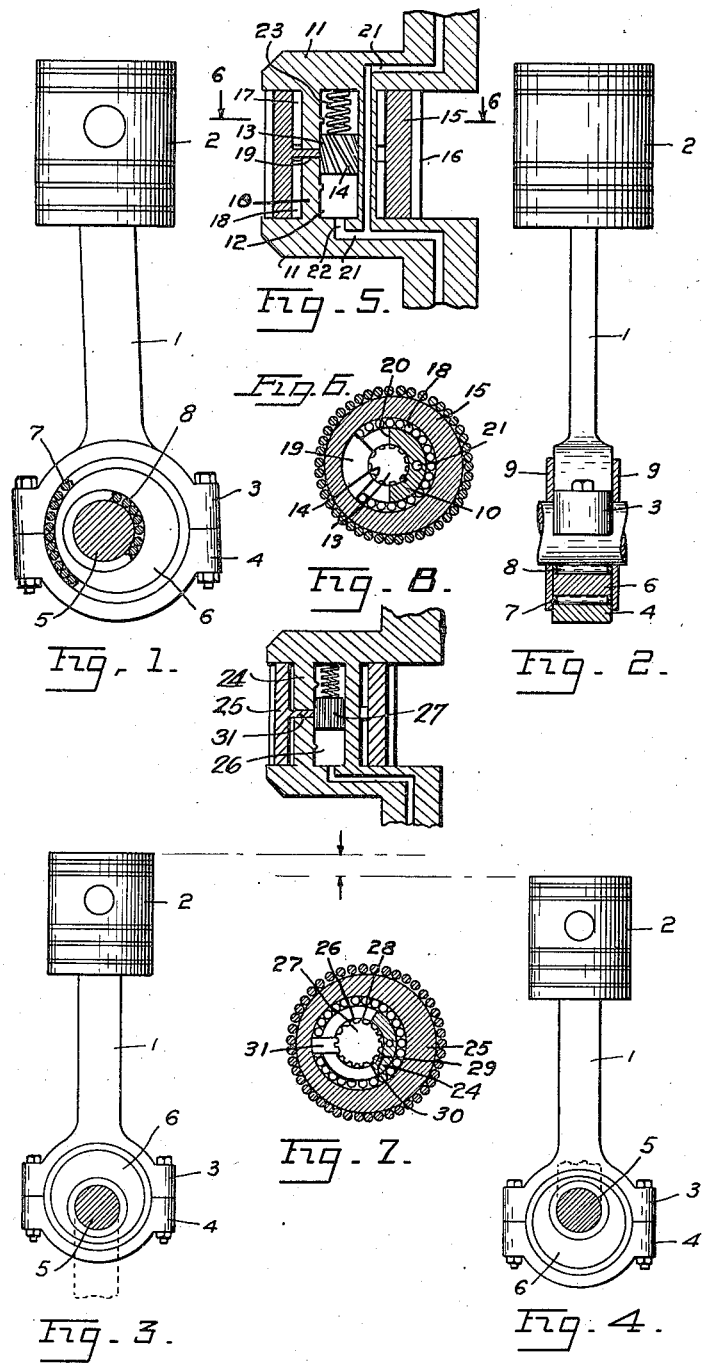
INVENTORS
JULIUS DUSEVOIR
GEORGE STERLING EDWARDS
BY
Lincoln Johnson
ATTORNEY.

Patented Oct. 3, 1939

2,174,780

UNITED STATES PATENT OFFICE 2,174,780

VARIABLE STROKE CONNECTING ROD

Julius Dusevoir, San Leandro, and George Sterling Edwards, San Francisco, Calif.

Application January 3, 1938, Serial No. 183,142

1 Claim. (Cl. 74—600)

This invention relates particularly to a connecting rod construction, the stroke of which will vary automatically because of variable reciprocating forces in the apparatus in which the connecting rod is used.

An object of the invention is to provide an automatic variable stroke connecting rod for use in engines, pumps, compressors and other engines utilizing connecting rods, for the purpose of effecting higher volumetric efficiency in the engine; a more complete scavenging operation than could be accomplished with a set stroke connecting rod; to increase the compression proportionately to the engine speed due to variable reciprocating forces; and to reduce detonation.

A still further object of the invention is to provide a connecting rod which has interposed between the body thereof and the throw of the crank shaft to which it is connected, a rotatable eccentric, whereby rotation of the eccentric, due to the reciprocating force applied to the connecting rod, will lengthen or shorten the stroke of the connecting rod in direct ratio to the speed at which the connecting rod reciprocates.

Other objects and advantages are to provide a variable stroke connecting rod that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claim following the description, it is desired to cover the invention in whatsoever form it may be embodied.

In the accompanying drawing:

Fig. 1 represents a side elevation, partly in section, having a crank shaft connection constructed in accordance with my invention.

Fig. 2 is a front elevation of Fig. 1.

Fig. 3 is a side elevation similar to Fig. 1, showing the connecting rod eccentric in a lengthened position.

Fig. 4 is a view similar to Fig. 3 showing the connecting rod eccentric in the shortened position.

Fig. 5 is an enlarged cross section taken through a throw of the crank shaft, showing mechanical means for turning the connecting rod eccentric.

Fig. 6 is a section taken through Fig. 5 on the line 6—6.

Fig. 7 is a section taken through the crank throw and eccentric and illustrating mechanical means for locking the eccentric in a set position.

Fig. 8 is an enlarged cross section taken through a throw of the crank shaft, showing hydraulic means for locking the connecting rod eccentrically in a set position.

The construction and function of the conventional type of set stroke connecting rod as used in engines, compressors, pumps and the like, is so well known further explanation thereof will be omitted herein.

In our invention we have provided a connecting rod 1, having a piston 2 pivotally mounted on one end thereof and at its lower end the connecting rod is provided with the usual complementary flanges 3 and 4 for attachment to the throw 5 of a crank shaft. Between the crank shaft throw 5 and the flanges 3 and 4 I have provided an eccentric 6, the outer circumference of which is eccentric relative to the center axis of the crank throw 5. A series of rollers 7 are interposed between the eccentric 6 and the connecting rod flanges 3 and 4, and similar rollers 8 are interposed between the eccentric 6 and the crank shaft throw 5. Plates 9—9 are provided on opposite faces of the flanges 3 and 4 to hold the eccentric 6 and bars 7 and 8 in position within the flanges 3 and 4 of the connecting rod. For ease of installation on the crank shaft, the eccentric 6 may be split on a medial line into two parts, and the aforesaid parts joined together with dowels or other aligning mediums.

In operation a connecting rod equipped with our eccentric connection between it and the crank shaft, will cause the said connecting rod to have a stroke which, under some conditions, will exceed its normal length of stroke by the amount of the eccentricity vested in the eccentric 6. Where the pressure forces applied to the piston are relatively nominal and the rate of reciprocation of the connecting rod is relatively slow, then the connecting rod would assume the position indicated in Fig. 4, and would function to all intents and purposes as does a set stroke connecting rod. Under slightly modified conditions, to wit, an increase in the speed of reciprocation, the eccentric 6 is thrown by centrifugal force upon the axis of the throw of the crank shaft, and will assume the position indicated in Fig. 3 wherein the length of stroke of the connecting rod is increased by the amount of eccentricity existent in the eccentric 6 and lengthens the stroke of the connecting rod by the distance indicated by the piston shown in Figs. 3 and 4. Where the speed of reciprocation of the connecting rod causes the eccentric to be automatically rotated around the throw of the crank shaft and the length of the stroke of the connecting rod to be increased, it is obvious that the piston will be moved higher in the cylinder of the piston, causing a greater compression effect to be given to the combustible mixture, thereby resulting in a highly volumetric efficiency of the engine, and also thereby more completely scavenging the engine cylinder on the exhaust stroke of the engine, and thereby also reducing the detonation in the engine on the firing stroke. Likewise, similar increases in efficiency will be obtained where the variable stroke connecting rod is used in compressors and pumps.

While the illustrations which we have noted above may be extreme situations encountered in engine operation, the nature of the freely rotatable eccentric is such that it will automatically compensate itself to the running conditions of the engine and irrespective of the pressure conditions in the engine cylinder or the speed of rotation of the crank shaft, will automatically adjust itself to add extra efficiency to the engine operation where the operating conditions will permit that result to be accomplished.

In Figs. 1 through 4 inclusive, we have illustrated the eccentric as being of a split form, although it is to be considered within the scope of the invention that the eccentric be of unbroken form, and would be mounted on a throw of a crank shaft of the assembly type.

In Figs. 5 and 6, we have illustrated a portion of a crank shaft showing a hollow throw 10 connected at its opposite ends to the parallel cheek plates 11—11 of the crank shaft. The hollow interior of the crank throw 10 forms a cylinder 12 which would be capped or closed at its opposite ends. The cylinder 12 has a plunger 13 reciprocatingly confined therein and the outer periphery of the plunger has spirally disposed teeth 14 cut therein. An eccentric 15 is mounted around the throw 10 and the end of the connecting rod 16 is mounted around the eccentric 15. Roller bearings 17 and 18 are interposed between the crank throw and eccentric, and the eccentric and connecting rod. The inner face of the eccentric 15 is provided with a gear segment 19 thereon which extends through a slot 20 in the throw 10. The said gear segment meshes with the spiral teeth 14 on the plunger 13. Passages 21 are drilled in the cheek plates 11—11 and through the wall of the throw 10, and all of said passages are connected to a fluid pressure system. A by-pass connection 22 connects the passage 21 with the cylinder 12 on one side of the plunger 13. When fluid under pressure is directed into the cylinder 12 against the plunger 13, said plunger is caused to move axially in the cylinder 12 and the spiral teeth 14 on said plunger, by reason of their meshing engagement with the gear segment 19, cause said segment to rotate and in turn causes the eccentric 15 to be partially rotated around the axis of the throw 10. Rotation of the eccentric in this manner, will thus effect the length of the stroke of the connecting rod 16. This form of control of the eccentric 15 permits of a selected manual control of the length of stroke of the connecting rod which may be varied or changed at will to suit the whim of the engine operator.

Upon the release of the oil pressure behind the plunger 13, the plunger would be moved in a reverse direction by means of an expansion spring 23 confined within the cylinder 12, and the return movement of the plunger would rotate the eccentric 15 to whatever position the engine operator might desire for regulating the length of stroke of the connecting rod 16.

A suitable fluid pressure mechanism, not shown, would be used for generating a fluid pressure within the various passages and cylinders formed within the crank shaft, and the application of such pressure to be controlled by the conventional type of valves, not shown.

In the form of device shown in Fig. 7, we have provided a hollow crank throw 24 having the eccentric 25 rotatably mounted therearound. The cylinder 26 formed in the crank throw 24 has a plunger 27 slidably mounted thereon, and said plunger is provided with gear teeth 28 on the periphery thereof. An interior wall of the cylinder 26 is provided with a key slot 29 therein within which a pin 30 mounted on the plunger 27, is slidably confined to prevent the plunger 27 from rotating. The eccentric 25 is provided with a gear segment 31 thereon, which extends through a slot in the throw 24, and said gear segment 31 is adapted to be engaged by the teeth 28 on the plunger 27.

In the form of device shown in Fig. 7, the eccentric 25 would be swung into any selected and predetermined position by centrifugal force caused by racing the engine, and then locking the eccentric in the desired position by engaging the gear segment 31 thereon with the teeth 28 of the plunger 27. The plunger 27 is moved axially in the cylinder 26 by means of fluid pressure directed into the cylinder 26 and against one face of the plunger 27, in the manner heretofore described in connection with Figs. 5 and 6. An expansion spring is confined in the cylinder 26, the purpose of said spring being to move the plunger 27 out of engagement with the gear segment 31 on the eccentric 25, when the fluid pressure against said plunger is released. In this form of the device the eccentric 25 is rotated into or out of any of its selected positions by centrifugal force created by either stepping up or slowing down the rotation of the engine crank shaft.

The form of device shown in Fig. 7 accomplishes a locking of the eccentric after the eccentric has been rotated by centrifugal force into any desired position, while with the form of device shown in Figs. 5 and 6, the eccentric is moved mechanically into any selected position.

Having thus described this invention, what we claim and desire to secure by Letters Patent is:

An apparatus to vary the length of stroke of an engine connecting rod, including in combination a piston, a crank, a connecting rod therebetween, an eccentric sleeve interposed between the connecting rod and crank shaft, adapted to vary the length of stroke of the connecting rod and piston by a turning movement of said sleeve relative to the crank shaft; a gear plunger reciprocatingly confined in said crank shaft; a toothed element on said eccentric sleeve engaging said gear plunger; a fluid pressure means for actuating said gear plunger to turn said eccentric sleeve about the crank shaft; and spring means for returning said gear plunger and for reversing the direction of movement of said eccentric sleeve upon the release of the fluid pressure.

GEORGE STERLING EDWARDS.
JULIUS DUSEVOIR.